United States Patent [19]

Snaper

[11] 4,107,997

[45] Aug. 22, 1978

[54] ALLOY SENSOR

[75] Inventor: Alvin A. Snaper, Las Vegas, Nev.

[73] Assignee: Advanced Patent Technology, Incorporated, Las Vegas, Nev.

[21] Appl. No.: 613,528

[22] Filed: Sep. 15, 1975

[51] Int. Cl.$^2$ .............. G01F 23/24; C22C 11/06; C22C 30/04

[52] U.S. Cl. .............. 73/304 R; 73/61.1 R; 75/134 B

[58] Field of Search .............. 73/304 R, 61.1 R; 75/134 B

[56] References Cited

U.S. PATENT DOCUMENTS

| | | | |
|---|---|---|---|
| 1,252,010 | 1/1918 | Kinder, Jr. | 75/134 B |
| 1,333,237 | 3/1920 | Ayala | 75/134 B |
| 2,593,252 | 4/1952 | Booth | 73/304 R |
| 3,678,749 | 7/1972 | Harper | 73/304 R |

FOREIGN PATENT DOCUMENTS

| | | | |
|---|---|---|---|
| 669,808 | 10/1964 | Italy | 73/304 R |
| 17,644 | 9/1972 | Japan | 75/134 B |

Primary Examiner—Richard C. Queisser
Assistant Examiner—Joseph W. Roskos
Attorney, Agent, or Firm—Seiler & Quirk

[57] ABSTRACT

An alloy composition comprises lead, tin and zinc, each being present in an amount of between about 20 and about 45% by weight. Preferably, the composition also contains small amounts of up to about 0.1% each of copper and tellurium. When in contact with water or other aqueous composition, the alloy generates a current directly proportional to the alloy surface area exposed to the liquid.

8 Claims, 2 Drawing Figures

ALLOY SENSOR

BACKGROUND OF THE INVENTION

The present invention is directed to a novel alloy combining lead, zinc and tin in certain proportions and including small amounts of copper and tellurium and has the property of generating an electrical current when exposed to aqueous compositions, even distilled water. Such a property provides numerous uses involving water detection in otherwise non-aqueous media, or water level sensing in a variety of applications. Examples include water detection in hydrocarbon compositions, for example, in fuel tanks where water detection and removal is particularly important. Water level sensors may also be used to great advantage in water holding or storage cavities and containers, not normally visible, but where level sensing is important such as automobile radiators, batteries, bilges, water tanks, processing equipment, aircraft fuel tanks, as well as any other normally closed water containing systems where aqueous fluid level monitoring is important or presence of water must be detected. Utilizing the alloy of the invention in an electrode form extending into such water containing vessels or cavities, by connecting a rod or plate of the alloy to an ammeter or other direct current detecting means, both detection of water or aqueous composition contacting the alloy rod or plate as well as the level of the water along the rod or plate can be observed. These advantages as well as other uses of the alloy composition of the invention will be evident to those skilled in the art from the following detailed description.

DETAILED DESCRIPTION OF THE INVENTION

Figure 1:
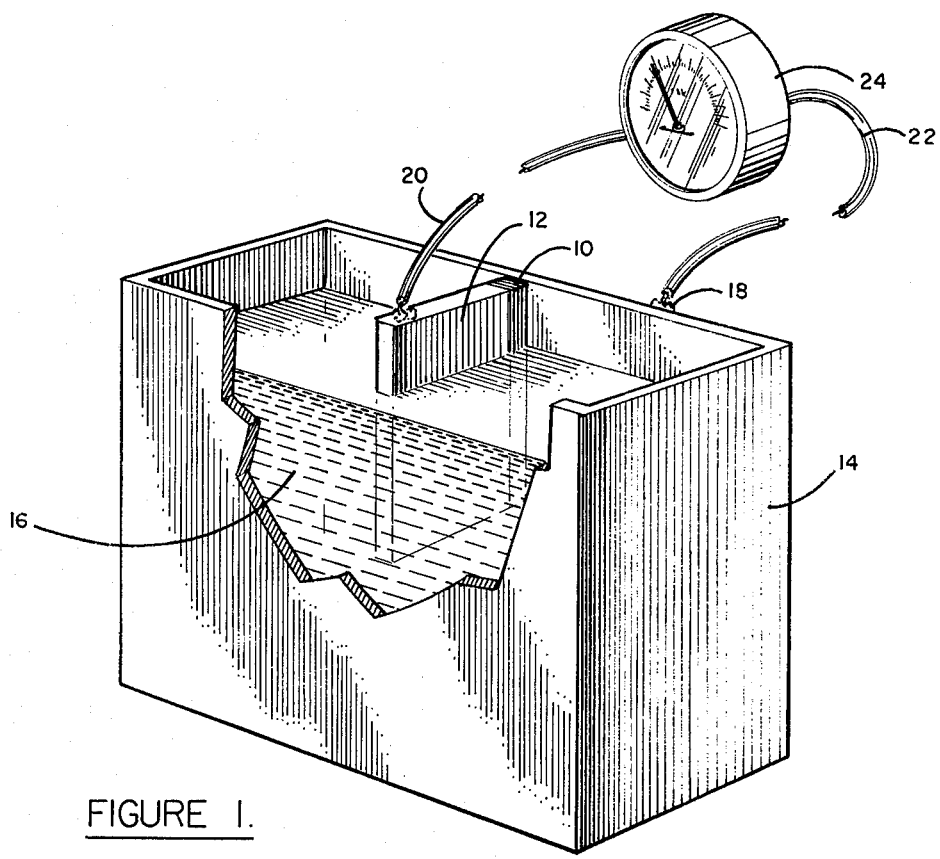
FIG. 1 illustrates use of alloy of the invention as a water level sensor.

The alloy composition is between about 20 and about 45% each, by weight, lead, tin and zinc. Alloy compositions containing these metals in any range within those proportions may be used but preferred compositions are those utilizing between about 30 and 35% each of the three metals. It has been found a composition consisting of only the three metals is unsuitable because the metals are not generally miscible and separate on cooling to their solidification point. Accordingly, it is desirable to include a small amount of copper, for example, up to about 0.1% by weight, preferably at least about 0.001%, and more preferably between about 100 and 500 parts per million. The presence of copper is found to be effective in producing a homogeneous mixture which does not separate into the individual metals and remains in the alloy state on cooling.

It is also preferred to incorporate a small amount of tellurium, in substantially the same range as previously indicated for the copper. The tellurium increases the cell potential of the alloy electrode thus improving its sensitivity when used to detect water, which is especially important where detection of very small quantities of water or more accurate sensing of water levels are important. The copper and tellurium may be added in any form compatible with the metal and which may be readily dispersed in the alloy melt. Various available salts of these materials may be used but especially useful are the oxides, copper oxide and tellurium dioxide, both which are readily available, relatively easy to handle, and which leave substantially no residue or undesirable impurities in the alloy.

In producing the alloy of the invention, lead, zinc and tin in any suitable elemental form are combined and heated. Preferably, the materials are first placed together in the desired proportions in an acid medium, preferably in the presence of an acid solution having a pH of less than 3. Preferred acids are the mineral acids including hydrochloric, nitric and sulfuric acids, with the latter being most preferred. The small amounts of copper oxide and tellurium dioxide are also induced into the mixture which is then heated up to above the melting points of the metals, for example, above about 900° F. Preferably, a furnace or retort is used on which vacuum is pulled so as to reduce oxygen present as well as to remove volatilized gases from the heated composition and acid media. The alloy is then allowed to cool and is recovered.

It will be understood that the alloy can be formed to any desired shape depending on its use. Normally, the melting point of the alloy will be between about 400° and about 800° F depending on the specific ratio of metals employed, those being higher in zinc, for example, having a higher melting point than those which have greater amounts of tin. The resulting alloy is quite brittle and is thus not ductile or malleable, at least at ambient temperatures. However, the alloy is relatively bright and crystalline appearing. In the presence of water or other aqueous solution, the alloys exhibit a negative potential of between about 0.5 and about 1.0 volts, depending on the specific ratio of metals in the composition. Moreover, the current produced by the alloy is directly proportional to the surface area to which it is exposed, normally between about 200 and about 300 microamps per square inch of alloy surface area exposed to the aqueous liquid. However, the specific current is affected by dissolved materials in the aqueous fluid, for example, salts or materials which dissociates in water to form electrolytes. In most instances, the aqueous liquid detected will be an electrolyte solution due to dissolved salts or impurities often found in the water. Yet, a current is generated in pure, distilled water.

Observing now the drawings, there is illustrated in FIG. 1 the use of the alloy to determine the level of water or other aqueous solution in a container. Specifically, a sensing member 12, consisting of an alloy of the invention, is secured within container 14, the container also being a conducting material so that the sensor is not to come into direct contact with the container. For this purpose, the sensor has been mounted along one side of the container interior as shown and is separated from that side by an insulator strip 10 which may be made of any non-electrical conducting material such as plastic, fiberglas, and the like. It will be noted that alloy sensor 12 extends downwardly into container 14 any desired distance, depending on the depth within the container that it is desired to detect and monitor liquid 16 levels. The alloy sensor is electrically connected via conducting wire 20 to ammeter 24. The other ammeter terminal is electrically connected to the container 14 at solder joint 18 through conducting wire 22 or similar means, again it being understood that the container itself comprises an electrically conductive metal or alloy and is in direct contact with aqueous fluid 16.

Because of the properties of alloy sensor 12, the level of the aqueous fluid in the container can be monitored by reading the detected current, in microamperes (DC) with the specific reading observed being directly proportional to the surface area of the sensor in contact with the aqueous fluid. Thus, the scale of the ammeter can be calibrated to be read in the level of the aqueous fluid rather than in microamperes. Moreover, when the level of the aqueous fluid drops below the sensor, the ammeter reading will be zero thus indicating that the level has dropped below the lower edge of the sensor. It will be appreciated that a device incorporating the sensor of the invention can be used to indicate water levels or other aqueous fluid levels in batteries, water containers, bilges, radiators, manufacturing and processing equipment in which aqueous liquid levels are critical, and any similar applications where liquid level monitoring is desired but where the liquid or container is not normally or readily exposed for convenient visual observation. Thus, utilizing such a sensor combined with an ammeter calibrated as desired for visual readout, the monitor can be placed at any convenient remote location for such observation, again being electrically connected to the sensor as well as to another electrically conducting material in contact with the liquid to be monitored but not in direct physical contact with the sensor.

Figure 2:
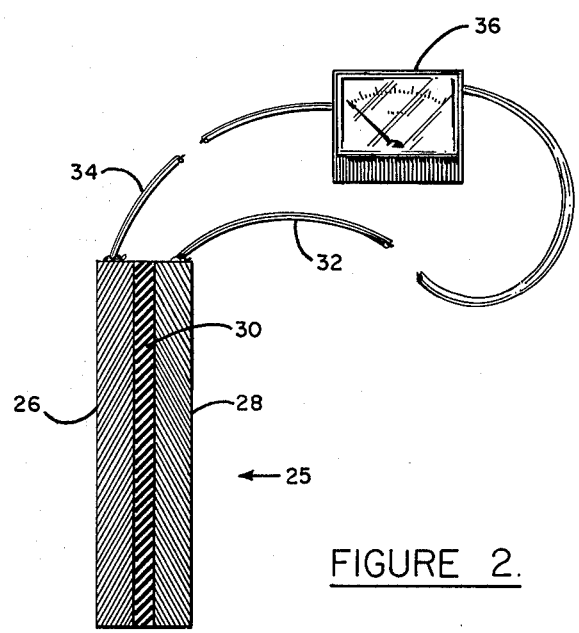
FIG. 2 is a sectional view showing a composite water detecting or level sensing electrode incorporating an alloy of the invention.

FIG. 2 illustrates a sensor 25 which is a composite of alloy 28 of the invention and a conducting material such as steel, carbon or the like which will not be readily dissolved or dissociate in the aqueous fluid to be monitored. Between the two conductors is a non-conducting material 30, similar to the non-conducting insulator 10 referred to in FIG. 1, again any suitable electrical insulating composition. Sensor alloy 28 is connected to ammeter 36 via wire 32 while conductor 26 is connected by wire 34 to the other ammeter terminal. Accordingly, this embodiment illustrates the use of a single sandwich type sensor which can be used for example, to detect aqueous fluid levels or the presence of water in containers or other applications where it is not desired to utilize the container itself as the conductor between the fluid and alloy sensor or where the container or vessel itself is not of a conducting material. Other uses and applications combining the alloy of the invention in order to be advantageously used for specific applications will be understood by those skilled in the art.

The following example is given for illustration only and the scope of the invention is not intended to be limited to any specific proportions or materials described other than as previously given.

An alloy composition was produced by combining 500 grams each of lead, tin and zinc in a retort to which was added 100 milliliters of 1.0 normal sulfuric acid and 1.5 grams of tellarium dioxide and 0.15 grams of copper (cupric) oxide. The mixture was placed in the retort on which a partial vacuum was drawn and the composition was heated to a temperature of 920° F. Thereafter, the retort was cooled and the composition recovered was found to be a substantially homogeneous alloy having a melting point of 535° F. A portion of the alloy was formed into an elongated rod having a length of 10 inches and a surface area of 2.5 square inches. The alloy rod was electrically connected to one terminal of an ammeter having a scale of 0 to 500 microamperes while a steel rod was connected to the other terminal. The steel and alloy rods were separated to prevent physical contact utilizing an electrically insulating material and were immersed into distilled water. As the end of the alloy rod first touched the water, the ammeter pointer was deflected slightly. As the alloy rod was further extended into the water, the current detected at the microamp continually rose directly proportionately to the length of the rod extended into the water.

From the foregoing description it will be evident that the alloy of the invention exhibits properties quite useful in a number of applications. Other uses and modifications of the alloys within the purview of the invention will be evident to those skilled in the art.

I claim:

1. A composition consisting essentially of 20–45% each by weight lead, tin and zinc and between about 0.001 and about 0.1% by weight copper.

2. A composition comprising 20–45% each by weight lead, tin and zinc and between about 0.001 and about 0.1% by weight tellurium.

3. A composition comprising 20–45% each by weight lead, tin and zinc and up to about 0.1% by weight copper and up to 0.1% by weight tellurium.

4. The composition of claim 3 wherein said amounts of copper and tellurium are between about 0.01 and 0.1%.

5. A method of detecting the presence of water in a major amount of non-aqueous liquid comprising contacting an alloy of claim 4 with said liquid and sensing current flow from said alloy.

6. A method of measuring the level of an aqueous composition comprising exposing said composition to an electrode of an alloy of claim 4, detecting the magnitude of current passing from said electrode and determining the surface area of said electrode exposed to said composition which is directly proportional to said current magnitude.

7. A water sensing device comprising an alloy of claim 4, a conductive metal, and a non-conductive material separating said alloy and said metal said metal and said alloy being electrically connected to means for detecting current flow.

8. An alloy consisting essentially of between about 30 and 35% each by weight lead, tin and zinc and up to about 0.1% by weight copper and up to about 0.1% by weight tellurium.

* * * * *